United States Patent
Bucci et al.

(10) Patent No.: US 9,781,093 B2
(45) Date of Patent: Oct. 3, 2017

(54) AUTHENTICATION OF A SECURE ELECTRONIC DEVICE FROM A NON-SECURE ELECTRONIC DEVICE

(71) Applicant: Morpho, Issy les Moulineaux (FR)

(72) Inventors: Damien Bucci, Issy les Moulineaux (FR); Dominique Sobczyk, Issy les Moulineaux (FR)

(73) Assignee: Morpho, Issy les Moulineaux (FR)

( * ) Notice: Subject to any disclaimer, the term of this patent is extended or adjusted under 35 U.S.C. 154(b) by 64 days.

(21) Appl. No.: 14/863,955

(22) Filed: Sep. 24, 2015

(65) Prior Publication Data

US 2016/0094533 A1 Mar. 31, 2016

(30) Foreign Application Priority Data

Sep. 25, 2014 (FR) ...................................... 14 59069

(51) Int. Cl.
*H04L 29/06* (2006.01)
*G06F 21/44* (2013.01)

(52) U.S. Cl.
CPC .............. *H04L 63/08* (2013.01); *G06F 21/44* (2013.01); *H04L 63/00* (2013.01); *G06F 2221/031* (2013.01); *G06F 2221/032* (2013.01); *G06F 2221/2103* (2013.01); *G06F 2221/2115* (2013.01); *G06F 2221/2119* (2013.01); *G06F 2221/2129* (2013.01); *H04L 2463/00* (2013.01)

(58) Field of Classification Search
CPC ......... H04L 63/08; H04L 63/00; G06F 21/44; G06F 2221/031; G06F 2221/032; G06F 2221/2103; G06F 2221/2115; G06F 21/74; G06F 2221/2119; G06F 2221/2129
See application file for complete search history.

(56) References Cited

U.S. PATENT DOCUMENTS

| | | | |
|---|---|---|---|
| 7,302,585 B1 | 11/2007 | Proudler | |
| 2006/0090073 A1 | 4/2006 | Steinberg | |
| 2008/0235779 A1* | 9/2008 | Bogner | H04L 63/0815 726/8 |
| 2013/0275306 A1* | 10/2013 | Ignatchenko | G06Q 20/3825 705/44 |
| 2013/0305392 A1* | 11/2013 | Bar-El | H04L 9/08 726/29 |
| 2014/0007221 A1 | 1/2014 | Chhabra | |
| 2014/0282543 A1* | 9/2014 | Ignatchenko | G06F 9/45558 718/1 |
| 2014/0282959 A1* | 9/2014 | Mechaley, Jr. | G06F 21/36 726/7 |
| 2015/0038118 A1* | 2/2015 | Berteau | H04L 9/3271 455/411 |

(Continued)

FOREIGN PATENT DOCUMENTS

WO 2007/060322 A2 5/2007

*Primary Examiner* — Catherine Thiaw
(74) *Attorney, Agent, or Firm* — Christensen O'Connor Johnson Kindness PLLC (57) ABSTRACT

The application relates in particular to a method for authentication of a secure electronic device (BNK_SRV) from a non-secured electronic device (PC, SP) comprising an input peripheral (KBD, MS, TS, CAM), an output peripheral (SCR, SPK, PRN) and a secure electronic circuit (TPM). The application also relates to a secure electronic circuit (TPM), a computer program and a storage medium arranged to implement such a method.

5 Claims, 7 Drawing Sheets (56) References Cited

U.S. PATENT DOCUMENTS

2015/0063625 A1\* 3/2015 Martin ............... H04N 1/32325
 382/100
2015/0106897 A1\* 4/2015 Davis ................... H04L 63/083
 726/7

\* cited by examiner

AUTHENTICATION OF A SECURE ELECTRONIC DEVICE FROM A NON-SECURE ELECTRONIC DEVICE

FIELD OF THE INVENTION

The invention relates to the authentication of a secure electronic device (such as a bank server) from a non-secure electronic device (such as a personal computer or a cellphone).

BACKGROUND

Non-secure electronic devices are very widespread. Some of them derive their value from the fact that they are highly personalizable, that is to say it is possible to load therein all kinds of software for fulfilling the most diverse functions, which confers on them great flexibility. However, this requires opening up a large number of interfaces of the non-secure electronic device, to enable the largest possible number of third parties to develop the most varied possible software. By thus opening up the interfaces (that is to say the possible accesses), possibilities of abuse are also opened up. Making the interfaces secure often proves to be extremely constraining in the current state of knowledge, and therefore sometimes the wealth of functionalities is sometimes favored to the detriment of security. As a corollary, there exist numerous ways of violating the security of such non-secure electronic devices. For example, it is possible, with some of them, to load viruses, Trojan horses, spyware or all kinds of malware. There exists for example malware designed to intercept the keystrokes made on a keyboard of the non-secure electronic device and to spy on them or even (in addition) to modify them.

There also exists malware designed to take control of a screen of the non-secure electronic device and to display something other than what the electronic device is supposed to display. These various items of malware thus make it possible to intercept passwords and to modify transactions without the user of the non-secure electronic device being aware of it. A person making a bank transfer may thus think (on the basis of his keystrokes and the display) that he has made a transfer of a certain amount to a certain account, whereas the malware has in reality made a much higher transfer to another account (that of the attacker for example).

Installing a secure electronic circuit within a non-secure electronic circuit is known. This aims in particular to protect various tasks performed by the non-secure electronic device.

Reserving part of a screen of the non-secure electronic device for the secure electronic circuit is in particular known. Thus only the secure electronic circuit can display information in this part of the screen, and the user of the non-secure electronic device has thus the certainty that what is displayed in this screen part comes from the secure electronic circuit (rather than, for example, a virus directly controlling the screen). This solution does however require making this part of the screen unavailable for normal use, which is extremely detrimental in many situations.

Integrating a dedicated light emitting diode (hereinafter LED) in the non-secure electronic device, the LED being controlled solely by the secure electronic circuit, and having the LED switched on by the secure electronic circuit when the latter takes control of the screen, is also known. The user thus knows when what is displayed on the screen comes from this circuit. This solution does however require providing this LED, which gives rise to an additional cost (in terms of hardware), which is not always acceptable.

Finally, carrying out an authentication by means for example of a password (PIN code, secret phrase, etc.) previously recorded is known. However, the user is not in a position to know whether the authentication is taking place via a secure connection by the secure electronic circuit or via a false connection established for example by a virus.

Thus EP 1952297 A2 discloses a method for the authentication, by a user, of a secure operating mode of an information system comprising means for presenting information to the user, means for the entry of data by the user and storage means.

U.S. Pat. No. 7,302,585B1, EP 1056014 A1 and EP 1181645 A1 for their part disclose a data processing system comprising a secure display processor distinct from the main processor of the system. The secure display processor interacts with a chip card in order to extract and display a secure image.

SUMMARY

The invention improves the situation.

According to one aspect of the invention, a method for authenticating a secure electronic device from a non-secure electronic device comprising an input peripheral, an output peripheral and a secure electronic circuit comprises:

(a) taking control of the input peripheral and of the output peripheral by the secure electronic circuit;

(b) opening a secure session by the secure electronic circuit with the secure electronic device;

(c) acquiring user information by the secure electronic circuit;

(d) sending the user information, by the secure electronic circuit to the secure electronic device;

(e) receiving, by the secure electronic circuit, transformed user information resulting from a predetermined transformation applied by the secure electronic device to the user information;

(f) sending the transformed user information, by the secure electronic circuit to the output peripheral controlled by the secure electronic circuit;

(g) obtaining authentication information by the secure electronic circuit from the input peripheral controlled by the secure electronic circuit;

(h) authenticating the secure electronic device, by the secure electronic circuit, according to the authentication information obtained.

This method is advantageous in that it enables a human user of the non-secured electronic device to ensure that he has indeed established a secure connection with the secure electronic device.

According to another aspect of the invention, a secure electronic circuit arranged so as to be installed in a non-secured electronic device comprising an input peripheral and an output peripheral comprises:

an electronic control circuit for the input peripheral and output peripheral;

an electronic secure session opening circuit arranged to open a secure session with a secure electronic device;

an electronic user information acquiring circuit;

an electronic transmission circuit arranged to transmit user information to the secure electronic device;

an electronic reception circuit arranged to receive transformed user information resulting from a predetermined transformation applied by the secure electronic device to the user information;

an electronic transmission circuit arranged to send transformed user information to the output peripheral controlled by the secure electronic circuit;

an electronic obtaining circuit arranged to obtain authentication information from the input peripheral controlled by the secure electronic circuit;

an electronic authentication circuit arranged to authenticate the secure electronic device according to the authentication information obtained.

This circuit is advantageous in that it enables the aforementioned method to be implemented.

Another aspect of the invention relates to a computer program comprising a series of instructions which, when they are executed by a processor, implement the method according to one aspect of the invention.

Another aspect of the invention relates to a non-transitory computer readable storage medium storing a computer program according to one aspect of the invention.

Other aspects, aims and advantages of the invention will emerge from a reading of the description of one of the embodiments thereof.

BRIEF DESCRIPTION OF THE DRAWINGS

The invention will also be better understood by means of the drawings, in which.

DETAILED DESCRIPTION

Figure 1:
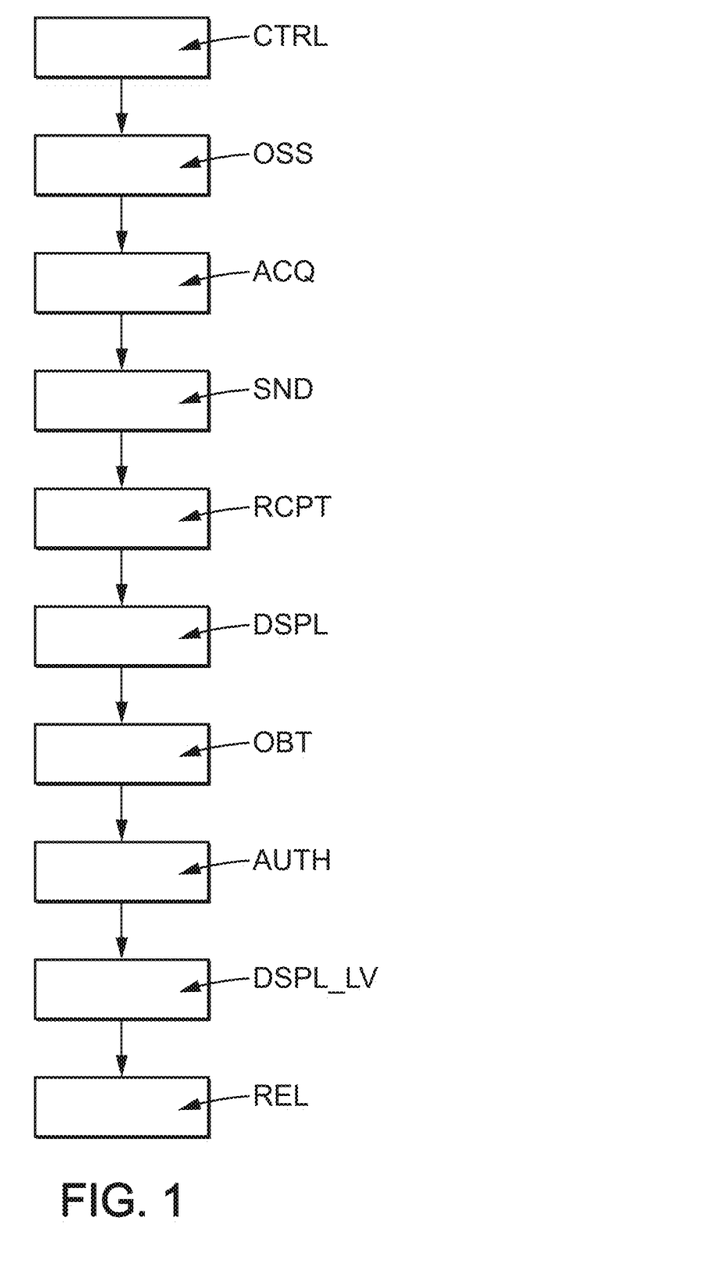
FIG. 1 illustrates a method according to one aspect of the invention.

FIG. 1 illustrates the consecutive steps of a method according to one aspect of the invention. FIG. 1 thus shows:

a taking of control CTRL of one or more input peripherals KBD, MS, TS, CAM, MIC and one or more output peripherals SCR, SPK, PRN, TS by a secure electronic circuit TPM, then an opening OSS of a secure session (for example of the VPN or TLS type) by the secure electronic circuit TPM with a secure electronic circuit BNK_SRV, then an acquisition ACQ, by the secure electronic circuit TPM, of user information IMG, then a transmission SND, by the secure electronic circuit TPM to the secure electronic device BNK_SRV, of user information IMG (via the secure session), then a reception RCPT (via the secure session), by the secure electronic circuit TPM, of transformed user information TRN_IMG resulting from a predetermined transformation applied by the secure electronic device BNK_SRV to the user information IMG, then a sending DSPL, by the secure electronic circuit TPM to the output peripheral SCR, SPK, PRN, TS controlled by the secure electronic circuit TPM, of the transformed user information TRN_IMG, then an obtaining OBT of authentication information OK_NOK by the secure electronic circuit TPM from the input peripheral KBD, MSD, TS, CAM, MIC controlled by the secure electronic circuit TPM, then an authentication AUTH, by the secure electronic circuit TPM, of the secure electronic device BNK_SRV according to the authentication information OK_NOK obtained, then a sending DSPL_LV by the secure electronic circuit TPM of release information SEC_MSG to said output peripheral SCR, SPK, PRN, TS (warning the user that he is quitting secure mode, that is to say that the control CTRL of the input and output peripherals by the secure electronic circuit TPM is ceasing), then a release REL of the input peripheral KBD, MS, TS, CAM, MIC and of the output peripheral SCR, SPK, PRN, TS by the secure electronic circuit TPM.

Figure 2:
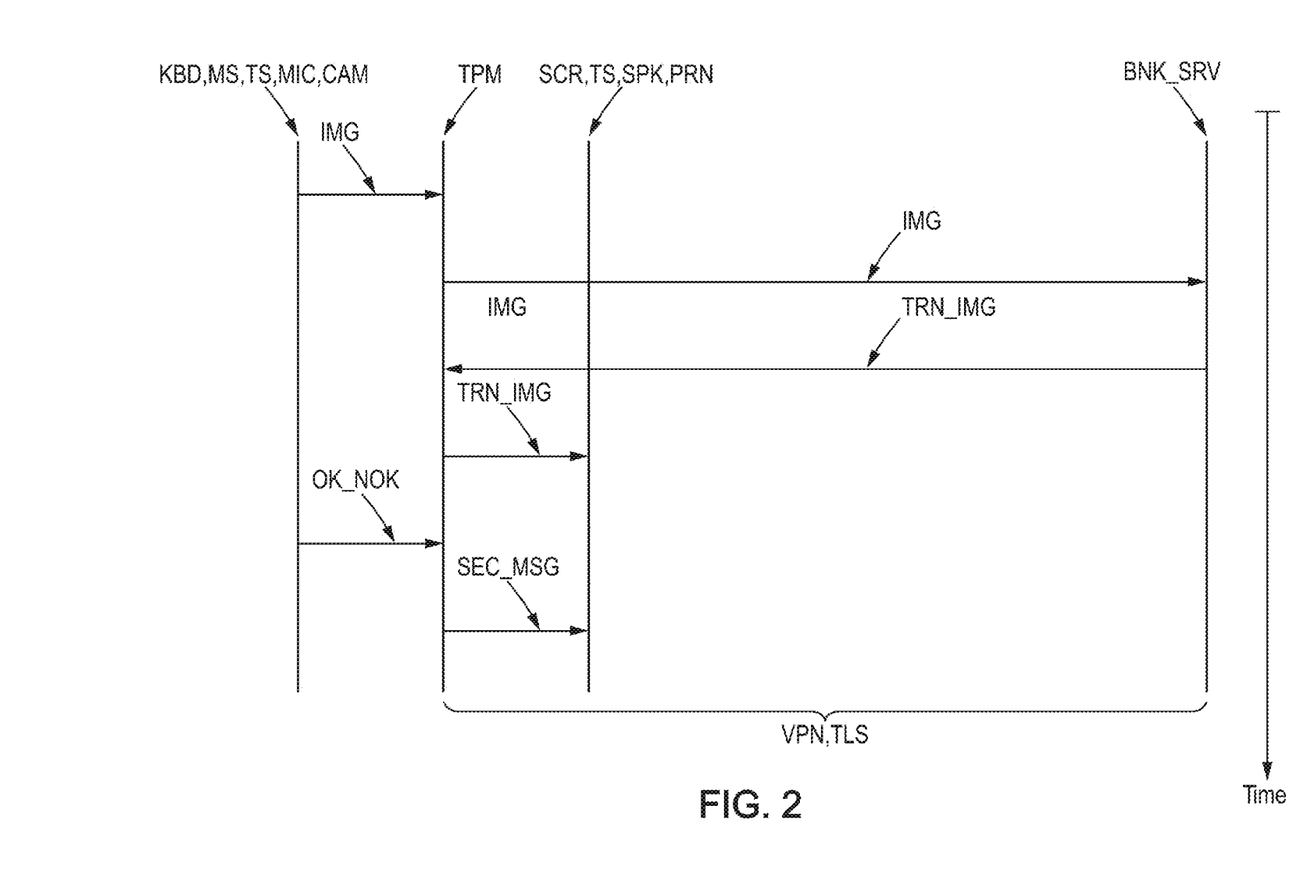
FIG. 2 illustrates said method in a different way.

FIG. 2 shows the same method, illustrating the exchanges of information between the various entities. The horizontal bracket denoted VPN, TLS illustrates the secure session between the secure electronic circuit TPM and the secure electronic device BNK_SRV. The output peripherals SCR, TS, SPK, PRN are shown between the secure electronic circuit TPM and the secure electronic device BNK_SRV for convenience of illustration but are in principle not involved in the secure session VPN, TLS, which directly connects the secure electronic circuit TPM and the secure electronic device BNK_SRV.

FIG. 2 thus illustrates, with the time elapsing along the downwardly oriented vertical axis:

an acquisition ACQ, by the secure electronic circuit TPM, of user information (in this case an IMG), obtained from an input peripheral (in this case it may be a camera CAM), then a transmission SND, via a secure channel VPN, TLS, of the image IMG of the secure electronic circuit TPM to the secure electronic device BNK_SRV, a reception RCPT (via the secure session), by the secure electronic circuit TPM, of transformed user information (transformed image TRN_IMG) issuing from a predetermined transformation applied by the secure electronic device BNK_SRV to the user information IMG, then a sending DSPL, by the secure electronic circuit TPM to the output peripheral SCR, SPK, PRN, TS controlled by the secure electronic circuit TPM (in this case the screen SCR or the touch screen TS or the printer PRN), of the transformed user information TRN_IMG, then an obtaining OBT of authentication information OK_NOK by the secure electronic circuit TPM from the input peripheral KBD, MS, TS, CAM, MIC controlled by the secure electronic circuit TPM (the human user may thus, after having perceived, by means of the output peripheral, the transformed user information and, after having verified whether it was in accordance with the transmitted user information, entering, in a secure fashion via an input peripheral, information OK_NOK indicating that there is conformity or not), then an authentication AUTH (not shown), by the secure electronic circuit TPM, of the secure electronic device BNK_SRV according to the authentication information OK_NOK obtained, then a sending DSPL_LV, by the secure electronic circuit TPM, of release information SEC_MSG to said output peripheral SCR, SPK, PRN, TS (warning the user that he is quitting secure mode, that is to say that the control CTRL of the input and output peripherals by the secure electronic circuit TPM is ceasing), then a release REL (not shown) of the input peripheral KBD, MS, TS, CAM, MIC and of the output peripheral SCR, SPK, PRN, TS by the secure electronic circuit TPM (that is to say the secure electronic circuit is ceasing to control said peripherals and is making them directly accessible to other entities).

Figure 3:
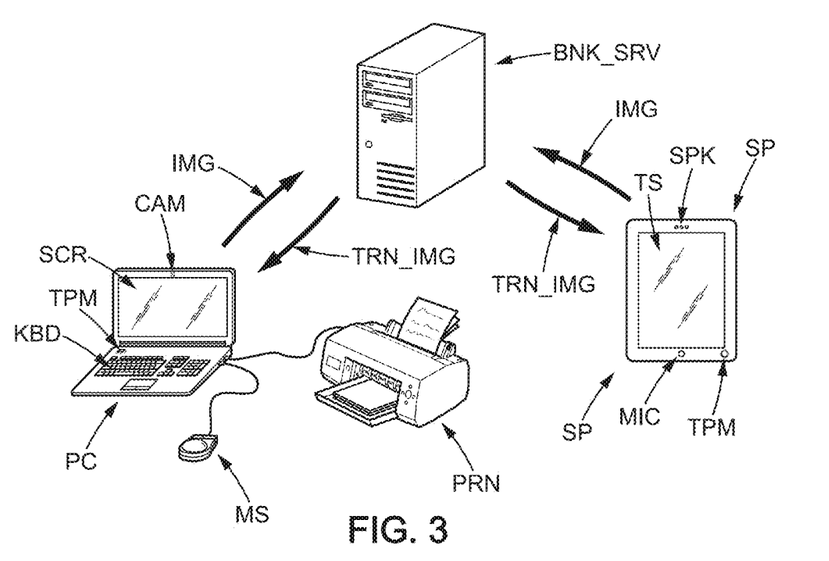
FIG. 3 illustrates an electronic system according to one aspect of the invention.

FIG. 3 is an electronic system according to one aspect of the invention. The system comprises a secure electronic device BNK_SRV (in this case a bank server). This secure electronic device BNK_SRV communicates with non-secured electronic devices such as a personal computer PC or an intelligent cellphone (smartphone) SP. These non-secured electronic devices comprise input peripherals such as a keyboard KBD, a mouse MS, a photographic apparatus (or camera) CAM, a microphone MIC or a touch screen TS. They also comprise output peripherals such as a screen SCR, a speaker SPK, a printer PRN or a touch screen TS (which is both an input and an output peripheral).

The secure electronic device BNK_SRV can thus receive information (such as an image IMG) from the non-secured electronic devices and itself transmit to them information (such as a transformed image TRN_IMG).

Figure 4:
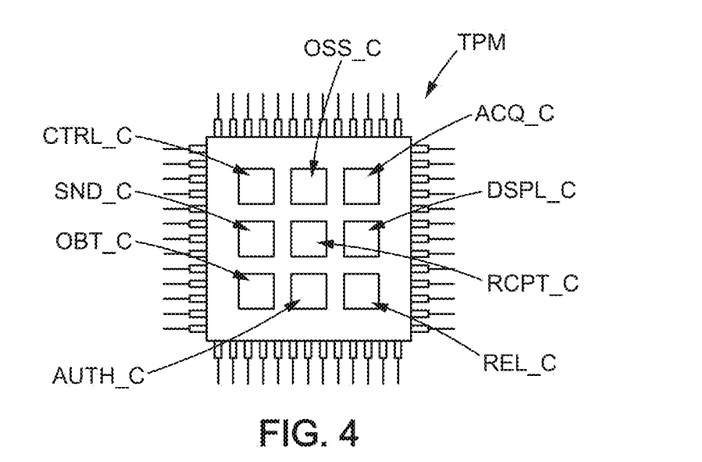
FIG. 4 illustrates a TPM of a system according to one aspect of the invention.

FIG. 4 depicts in more detail a secure electronic circuit TPM. This secure electronic circuit TPM may comprise in particular circuits CTRL_C, OSS_C, ACQ_C, SND_C, RCPT_C, DSPL_C, OBT_C, AUTH_C and REL_C. Each of these nine circuits may comprise the same processor of the secure electronic circuit TPM (common to all these circuits or alternatively to only some of them) or have its own processor. Each of these circuits may comprise a memory comprising a computer program able to make each of these circuits function (that is to say able to implement the various functions liable to have to be executed by each of these circuits). The aforementioned nine circuits made for this purpose each use a portion that is reserved to them of the same memory chip of the secure electronic circuit TPM. Alternatively, each of the nine circuits (or only some of them) comprises its own memory chip. Alternatively, the nine circuits are implemented in the form of custom-made electronic circuits (without a processor or computer program—for example in hard-wired logic).

Figure 5:
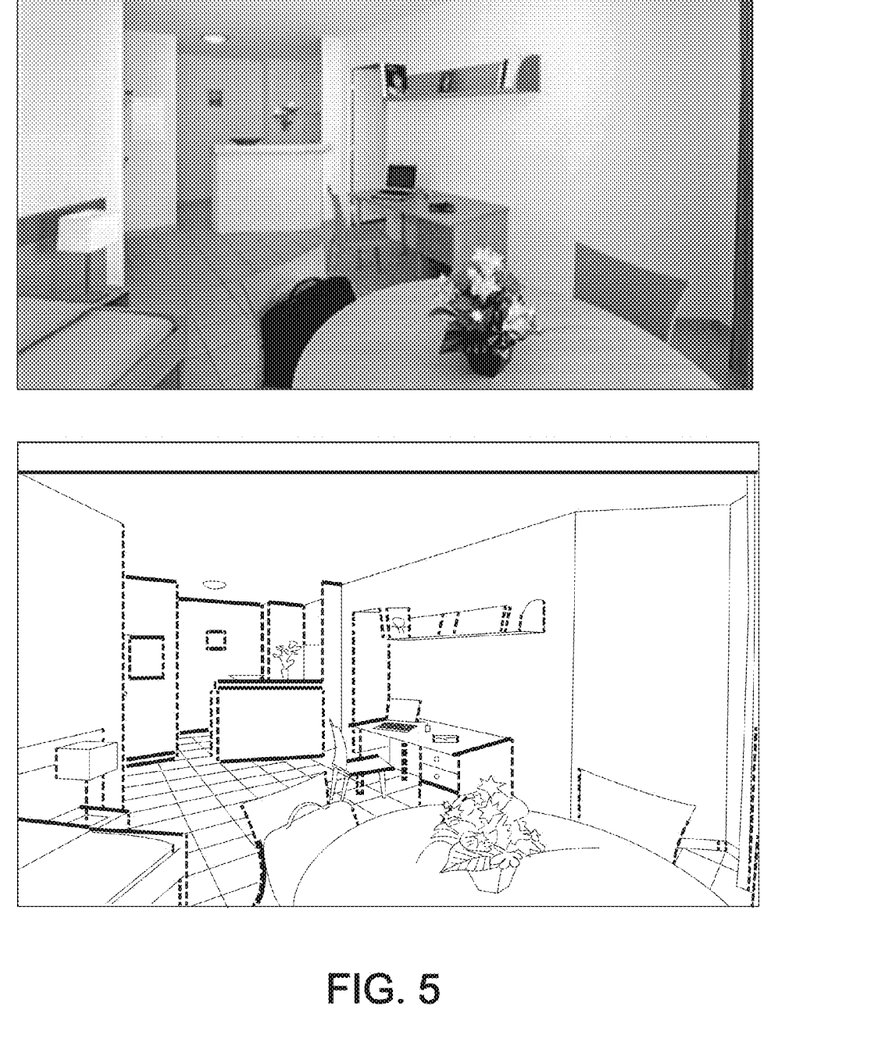
FIGS. 5 to 8 illustrate image transformation techniques that can be used in the context of the invention.

FIG. 5 illustrates an image transformation consisting of modifying a source image (the top image, in this case the photograph of a furnished room) identifying, by image processing, all the edges. The transformed image is an image composed of the identified edges. These edges are colored. The vertical edges (which may for example be defined as edges wherein the angle with respect to the vertical is between −10° and +10°) are colored with a certain color (for example green), the horizontal edges (which may for example be defined as edges wherein the angle with respect to the vertical is between −20° and +20°) are colored with another color (for example orange), and the other edges are colored randomly. The user chooses the color of the vertical and horizontal edges and expects that the transformed image received corresponds to the image that he has transmitted, modified by coloring the edges in the way that he has specified. In FIG. 5, the color not being enabled, the colors in the photograph are represented in gray shades and the colors of the edges are represented schematically by various types of line (solid, broken).

Figure 6:
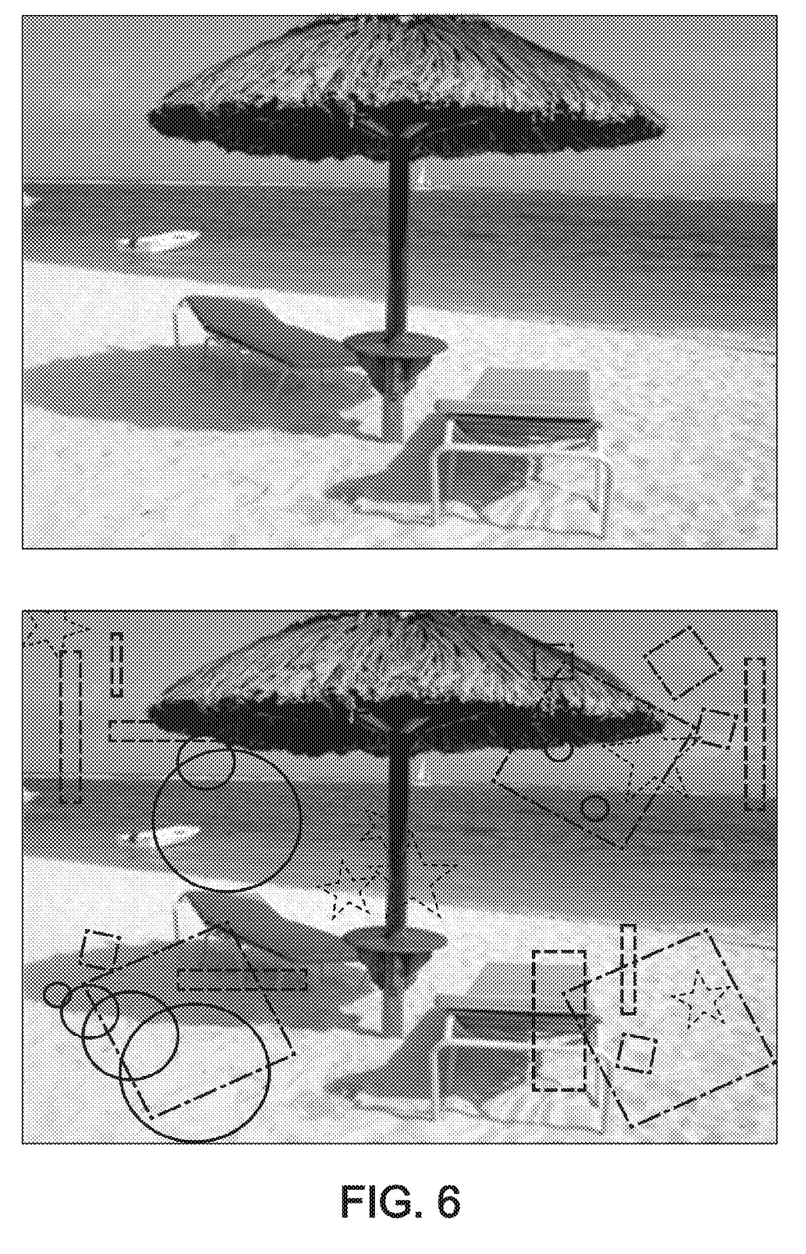

FIG. 6 illustrates another image transformation consisting of modifying a source image (the top image, in this case the photograph of two sun loungers and a parasol on a beach) by adding three stars at the center of the image. The user therefore defines the transformation by requesting the addition of three stars at the center of the image, in the form of a watermark. The size of the stars is chosen randomly and the stars are chosen substantially at the center of the image (random positioning but close to the center). To make the transformation more complex to guess by a third party possibly spying on the exchanges, the secure electronic device is arranged to add many other elements (including other stars) in a completely random fashion. The user must check that, among all the elements added, there are indeed three stars towards the center. In FIG. 6, color not being enabled, the colors in the photograph are represented in gray shades and the colors of the edges of the added elements are represented schematically by various types of line (solid, broken).

Figure 7:
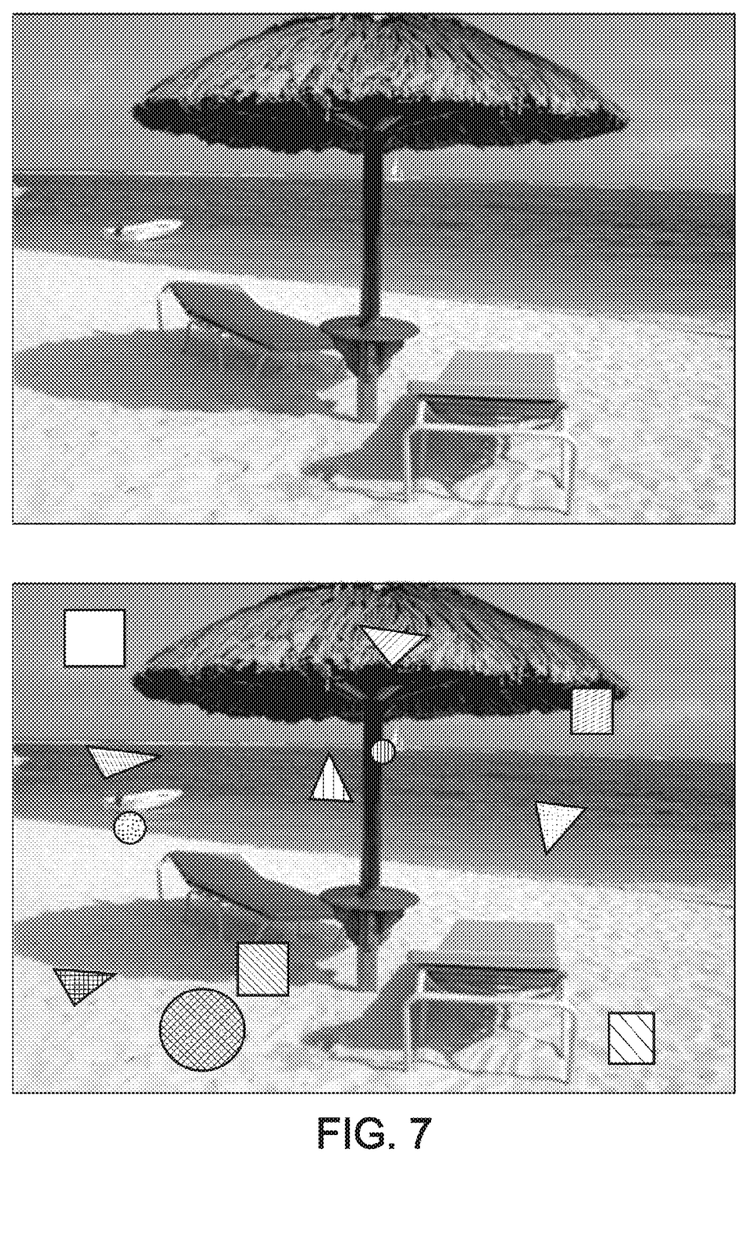

FIG. 7 illustrates another image transformation consisting of modifying a source image (the top image, in this case the photograph of two sun loungers and a parasol on a beach) by overlaying three disks on the image. The user has therefore previously defined the transformation by requiring the overlaying of three disks on the image. The size of the disks is chosen randomly. To make the transformation more complex to guess by a third party possibly spying on exchanges, the secure electronic device is arranged to add numerous other elements (but not other disks), completely randomly. The user must check that, among all the elements added, there are indeed three disks. In FIG. 7, color not being enabled, the colors of the photograph are depicted in gray shades and the colors of the surface of the added elements are depicted schematically by various types of hatching (dots, segments, grids).

Figure 8:
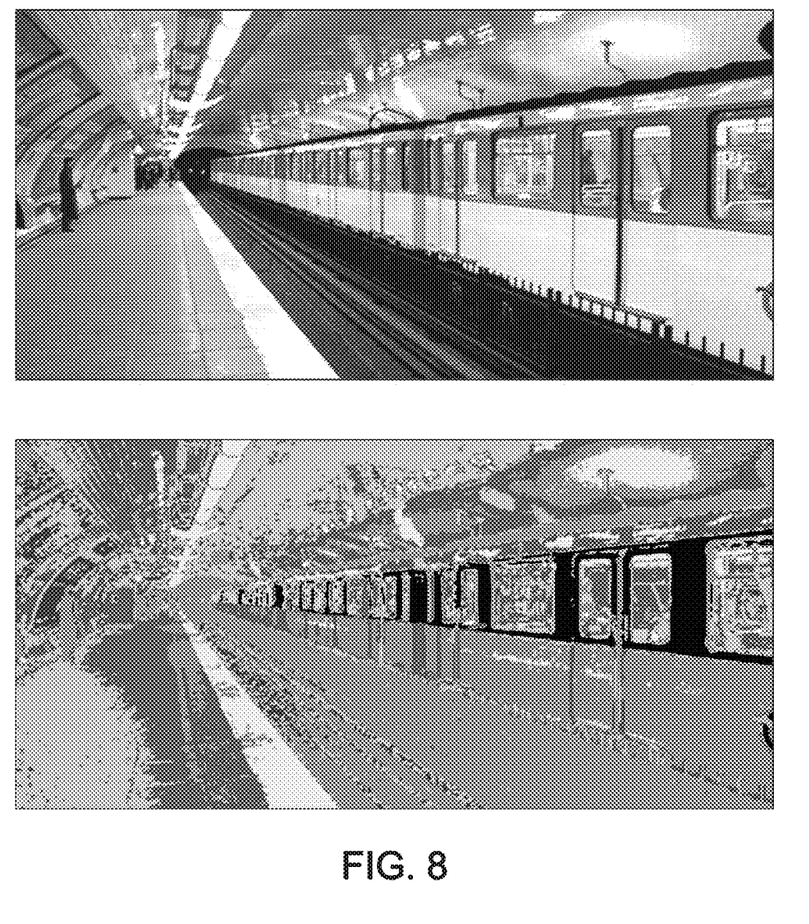

FIG. 8 illustrates another image transformation consisting of modifying a source image (the top image, in this case a photograph of a train in a Paris subway station) by thresholding the image (thresholding of the color histogram) and then replacing the dominant color with a color predefined by the user. The user can thus check that the dominant color in the image is indeed replaced by the color that he has defined. The other colors may be defined randomly. In FIG. 8, the color not being enabled, the colors in the photograph are depicted in gray shades and the thresholded colors of the bottom photograph are also represented by gray shades. In reality, the thresholded colors are more easily identifiable than gray shades (for example: orange, yellow, green, blue, red, white, gray).

A first embodiment relates to a method for authenticating a secure electronic device BNK_SRV. The secure electronic device BNK_SRV is for example a server for making bank transactions, or any other server, or even a secure customer device (such as a personal computer or a cellphone protected by a secure electronic circuit according to one embodiment of the invention).

The authentication is effected from a non-secured electronic device (such as a personal computer PC, or a smartphone SP) able to communicate (for example in client server mode, or in centralized or decentralized peer to peer mode) with the secure electronic device. The non-secured electronic device comprises an input peripheral (such as a keyboard KBD, a mouse MS, a touchscreen TS, a microphone MIC and/or a camera CAM). It also comprises an output peripheral (such as a screen SCR, optionally a touchscreen TS, a speaker SPK and/or a printer PRN). Finally, it comprises a secure electronic circuit TPM. This secure electronic circuit TPM makes it possible to establish a trusted execution environment designated by the acronym TEE). According to a possible implementation, this secure electronic circuit is an autonomous circuit. According to an alternative implementation, this secure electronic circuit is a secure subassembly or a non-secured electronic circuit, for example a secure subassembly with partitioning of execution of a processor (for example via the TrustZone® technology from the company ARM, available in particular on the products ARM Cortex-A57, ARM Cortex-A53, ARM Cortex-A15, ARM Cortex-A12, ARM Cortex-A9, ARM Cortex-A8, ARM Cortex-A7, ARM Cortex-A5 or ARM1176).

The method comprises a taking of control CTRL of the input peripheral (or of a plurality or all of them) and of the output peripheral (or of a plurality or all of them) by the secure electronic circuit TPM. This taking of control comprises for example a prohibition of access by the peripherals concerned to the main processor of the non-secured electronic device, access being reserved for the secure electronic circuit TPM. For example, the various peripherals may be connected by buses to the secure electronic circuit TPM (and not to the main processor directly), and the TPM may be connected to the main processor, and enable or not communication from/to the peripherals. Alternatively, the peripherals may be connected via buses to the main processor but the buses then comprise deconnection means activatable by the secure electronic circuit and preventing the main processor (and therefore any malware executed by the main processor) from accessing the peripherals. This taking of control also comprises the option for the secure electronic circuit TPM to send and receive information from the peripherals concerned (for example via the aforementioned buses).

The method comprises an opening of a secure session OSS (for example a virtual private network session VPN, or a secure http session TLS) by the secure electronic circuit TPM with the secure electronic device BNK_SRV. It is for example an end-to-end secure session (no intermediate equipment between the secure electronic circuit and the secure electronic device then being able to access the content of the session). According to one possible implementation, the secure session is protected by electronic signature of the exchange data and/or by enciphering of these data. According to one possible implementation, the enciphering and/or signature parameters as well as, where applicable, other session opening parameters, are defined during an enrollment phase described below. The secure electronic circuit TPM takes for example control of a network card (understood in the broad sense, and covering in particular Ethernet, WiFi, 3G, 4G, Bluetooth or other cards) of the non-secured electronic devices and establishes the secure session via this network card with the secure electronic device concerned. According to a possible implementation, the secure electronic device is arranged to accept opening a secure session only with a suitably authenticated secure electronic circuit. According to one possible implementation, the method comprises for this purpose a mutual authentication of the secure electronic circuit and of the secure electronic device. According to one possible implementation, the secure electronic device requires not only for the secure electronic circuit to be authenticated but for it to belong to a predefined and accepted category. For example, the opening of the secure session is subject to an authentication (for example of the PKI type) of the secure electronic circuit, and the secure electronic circuit checks that the certificate of the secure electronic circuit, in addition to being valid, is sent by a certification authority recognized for this purpose (rather than by just any certification authority), and/or that the certificate comprises certain particular attributes (such as an attribute specifying that the certificate is approved for use in the context of a secure session opening according to the first embodiment of the invention).

The method comprises an acquisition ACQ by the secure electronic circuit TPM, of user information (for example an image IMG, a sound, a series of vibrations, etc.). According to a possible implementation, the user information is information selected by a (human) user of the non-secured electronic device among available information (for example among files stored on the non-secured electronic device), or is information generated by the user. According to one possible implementation, the user receives an instruction to choose arbitrary user information (preferably different on each occasion so as to avoid playback, that is to say for single usage). According to one possible implementation, the user receives the instruction (combinable with the instruction of the previous phrase) to choose user information which, in addition to being retrievable by an output peripheral of the non-secured electronic device, is easily understood by this user. According to one possible implementation, the user information is arbitrary and/or for single use and/or easily understandable by a human user. According to one possible implementation, the acquisition ACQ takes place via a peripheral controlled by the secure electronic circuit, or at least within the range of a trusted execution environment TEE (supervised by said circuit).

The method comprises a transmission SND, by the secure electronic circuit TPM to the secure electronic device BNK_SRV, of the user information. According to one possible implementation, this transmission takes place via the previously established secure session, so that third parties cannot intercept the user information when it is transferred from the secure electronic device to the secure electronic circuit. This is then double security since, as will be disclosed below, even if the user information were to fall into the hands of an attacker, it would not (at least according to some implementations) be usable.

The method comprises a reception RCPT, by the secure electronic circuit TPM, of transformed user information TRN_IMG issuing from a predetermined transformation applied by the secure electronic device BNK_SRV to the user information IMG. According to one possible implementation, this predetermined transformation forms part of a set of predetermined transformations and is selected by the user during a prior enrollment phase. For example, the user goes to his bank branch and makes the aforementioned selection via a secure terminal available in the branch, said terminal transmitting the selection in a secure fashion to the secure electronic device BNK_SRV. Alternatively, the secure electronic circuit TPM stores the list of possible predetermined transformations in advance. According to this alternative, the user then locally (initially, then on each occasion that he wishes to modify his choice of transformations) makes the aforementioned selection, from his non-secured electronic device, under the control of the secure electronic circuit TPM (which transmits said selection to the secure electronic device BNK_SRV). The user is thus not obliged to go to a bank branch. According to one possible implementation, the user selects, during a prior enrollment phase, several predetermined transformations. According to one possible implementation, the selected transformation or transformations is or are such that it or they is or are difficult to determine solely on the basis of given user information and the result of this or these transformation or transformations applied to this user information. According to one possible implementation, the transformation or transformations is or are such that is or they is or are difficult to determine solely on the basis of a set of user information and the results of this or these transformation or transformations applied to the user information in this set. According to one possible implementation, the secure electronic device BNK_SRV randomly chooses a predetermined transformation among those selected by the user during the enrollment phase (when several have been selected during the enrollment). Having available several possible predetermined transformations makes an attack by an ill-intentioned third party more difficult even when such third party succeeded in accessing both several items of user information and the corresponding transformed user information. This is because the third party would have more difficulty in determining a transformation when the intercepted data statistically result from several (unidentified) transformations. This does however require the human user to await several possible transformations and to recognize any one of the transformations that he has selected during the enrollment as being a valid transformation.

The method comprises a sending DSPL, by the secure electronic circuit TPM to the output peripheral controlled by the secure electronic circuit TPM, of the transformed user information TRN_IMG. According to one possible implementation, the sending takes place to several peripherals. For example, the transformed user information may comprise (or consist of) a video displayed on a screen accompanied by a corresponding sound simultaneously broadcast on a speaker.

The method comprises an obtaining OBT of authentication information OK_NOK (which may indicate an authentication, OK, or a lack of authentication, NOK) by the secure electronic circuit TPM from the input peripheral controlled by the secure electronic circuit TPM. Thus a human user, recognizing that the transformed user information that has been communicated to him does indeed correspond to the user information that he sent to the non-secured electronic device during the acquisition phase, concludes that he is indeed communicating with the secure electronic device and consequently can use an input peripheral for introducing information indicating that he recognizes the transformed user information (or in the contrary case information indicating that he does not recognize the transformed user information).

The method then comprises an authentication AUTH, by the secure electronic circuit TPM, of the secure electronic device BNK_SRV according to the authentication information OK_NOK obtained.

If the authentication has succeeded, a transaction (for example a bank transfer or any sensitive operation made possible via the secure electronic device BNK_SRV) may be performed via the secure session using the peripherals controlled by the secure electronic circuit. According to one possible implementation, the transaction comprises a display (via an output peripheral controlled by the secure electronic circuit), followed by a validation (via an input peripheral controlled by the secure electronic circuit) and optionally preceded by an entry (via an input peripheral controlled by the secure electronic circuit), of information representing the transaction (such as a transaction amount, an identification of the participants in the transaction, etc.). According to one possible implementation, the validation comprises an entry of personal or confidential information (PIN code, etc.) via an input peripheral controlled by the secure electronic circuit.

The step SND occurs after the step ACQ. The step RCPT occurs after the step SND. The step DSPL occurs after the step RCPT and after the step CTRL. The step OBT occurs after the step DSPL. The step AUTH occurs after the step OBT.

According to a second embodiment, the user information of an authentication method according to the first embodiment is a photograph IMG.

According to a third embodiment, an authentication method according to the second embodiment comprises a taking of the photograph IMG by an input peripheral CAM of the non-secured electronic device SP. A user can thus use a camera CAM integrated in his smartphone SP in order to take any photograph (in his environment) and check whether the treatment carried out on this photograph by a transformation that he has allegedly selected is indeed the one (or one of those) that he is expecting. According to one possible implementation, the camera is controlled by the security electronic circuit (that is to say for example it is disconnected from the main processor by said circuit) so that there is no doubt about the fact that it is indeed the photograph taken by the user that is transmitted to said circuit. This is a double security since, even if an attacker were to make a substitution, the result would be that the transformed user information would not correspond to the user information that the user thinks he has sent.

According to a fourth embodiment, an authentication method according to one of the previous embodiments comprises a release REL of an input peripheral (for example a keyboard KBD, a mouse MS, a touchscreen TS and/or a camera CAM) and of the output peripheral (for example a screen SCR, a speaker SPK or a printer PRN) by the secure electronic circuit TPM. The release comprises the cessation of the control resulting from the taking of control. The release of the output peripheral is preceded by a sending DSPL_LV, by the secure electronic circuit TPM, of release information SEC_MSG to said output peripheral. Thus, if an attacker managed to instruct the secure electronic circuit to quit controlled mode, the secure electronic circuit TPM would in any event notify the exit from this mode (for example by means of a message displayed on a screen). According to one implementation, the secure electronic circuit releases the peripherals only after a predefined time (for example 1 second). This ensures that the release message will be broadcast during at least the time in question (and will therefore be visible to the user). According to one possible implementation (combinable with the previous one), the user must enable exit from the controlled mode in a secure fashion, for example via an input peripheral KBD controlled CTRL by the secure electronic circuit TPM (so that an exit from controlled mode is not possible or at least more difficult without the agreement of the user).

This is advantageous since this prevents a user thinking that he is in a controlled mode whereas this is no longer the case. The reverse solution (notifying the user of entering controlled mode) does not have any advantage since an attacker could simulate the message of entry to controlled mode while remaining in non-controlled mode (by means of control of the output peripherals in non-controlled mode).

The step REL occurs after the step AUTH.

According to a fifth embodiment, a secure electronic circuit TPM is arranged so as to be installed in a non-secured electronic device (for example a personal computer PC or a smartphone SP) comprising an input peripheral (for example KBD, MS, TS and/or CAM) and an output peripheral (for example SCR, SPK and/or PRN).

The secure electronic circuit TPM comprises an electronic control circuit CTRL_C for the input peripheral and the output peripheral.

The secure electronic circuit TPM comprises an electronic secure session opening circuit OSS_C arranged to open a secure session with a secure electronic device BNK_SRV.

The secure electronic circuit TPM comprises an electronic user information acquiring circuit ACQ_C arranged to acquire user information IMG.

The secure electronic circuit TPM comprises an electronic transmission circuit SND_C arranged to send user information IMG to the secure electronic device BNK_SRV.

The secure electronic circuit TPM comprises an electronic reception circuit RCPT_C arranged to receive transformed user information TRN_IMG issuing from a predetermined transformation applied by the secure electronic device BNK_ SRV to the user information IMG.

The secure electronic circuit TPM comprises an electronic transmission circuit DSPL_C arranged to send transformed user information TRN_IMG to the output peripheral controlled by the secure electronic circuit TPM.

The secure electronic circuit TPM comprises an electronic obtaining circuit OBT_C arranged to obtain authentication information OK_NOK from the input peripheral controlled by the secure electronic circuit TPM.

The secure electronic circuit TPM comprises an electronic authentication circuit AUTH_C arranged to authenticate the secure electronic device BNK_SRV according to the authentication information OK_NOK obtained.

According to one possible implementation, the electronic control circuit CTRL_C, the electronic secure session opening circuit OSS_C the electronic acquisition circuit ACQ-C, the electronic transmission circuit SND_C, the electronic reception circuit RCPT_C, the electronic transmission circuit DSPL_C, the electronic obtaining circuit OBT_C and the electronic authentication circuit AUTH_C are eight dedicated and distinct electronic circuits, designed for example on the basis of ASICs or FPGAs. According to one possible implementation, these eight circuits each comprise at least one processor and a memory storing a program arranged to implement the aforementioned respective function (associated with the respective circuit among the eight circuits) when it is executed by said processor. According to one possible implementation, all or some of these eight circuits share a common processor. According to one possible implementation in which these eight circuits each comprise a memory storing a program, these eight circuits also each comprise a processor (optionally common to all or some of the eight circuits) constituting a distinct discrete (and separate) component of the respective memory, optionally common to all or some of the eight different circuits. According to one possible implementation, the memory, optionally common to all or some of these eight circuits, is at least partly a standard memory of the non-secured electronic device (such as a personal computer or smartphone memory), enciphered by a cryptographic key stored in a part of the secure electronic circuit particular to said secure electronic circuit (that is to say not shared with components of the non-secured electronic device). In other words, according to this last implementation, a secure electronic circuit may use (and even comprise, within the meaning of the present embodiment) a part of the memory of the non-secured electronic device in which it is intended to be installed (in order to extend its own memory), provided that this memory part is enciphered in such a way as to be inaccessible to the non-secured electronic device and in particular to its main processor. This memory part (and the enciphered information that is stored therein) is then common to the secure electronic circuit and to the non-secured electronic device.

According to a sixth embodiment, the user information IMG of a secure electronic circuit TPM according to the fifth embodiment is a photograph.

According to a seventh embodiment, a non-secured electronic device SP comprises a secure electronic circuit TPM according to the sixth embodiment and an input peripheral CAM arranged to take the photograph IMG.

Another embodiment relates to a system comprising a non-secured electronic device comprising a secure electronic circuit according to one embodiment of the invention, and a secure electronic device according to one embodiment of the invention.

According to an eighth embodiment, a secure electronic circuit TPM according to the fifth or sixth embodiment comprises an electronic release circuit REL_C arranged to release the input peripheral and output peripheral, and arranged to send release information SEC_MSG to said output peripheral before releasing it.

According to one possible implementation, the electronic release circuit REL_C is a dedicated electronic circuit distinct from the aforementioned eight electronic circuits, designed for example on the basis of one or more ASICs and/or FPGAs. According to one possible implementation, this ninth circuit comprises at least one processor and a memory storing a program arranged to implement the aforementioned respective function (associated with this ninth circuit) when it is executed by said processor. According to one possible implementation, this ninth electronic circuit shares a common processor with all or some of these eight circuits. According to one possible implementation in which these nine circuits each comprise a memory storing a program, these nine circuits also each comprise a processor (optionally common to all or some of the nine circuits) constituting a discrete (and separate) component distinct from the respective memory, optionally common to all or some of the nine different circuits. According to one possible implementation, the memory, optionally common to all or some of these nine circuits, is at least partly a standard memory of the non-secured electronic device (such as a personal computer or smartphone memory), enciphered by a cryptographic key stored in a part of the secure electronic circuit particular to said secure electronic circuit (that is to say not shared with components of the non-secured electronic device).

According to a ninth embodiment, a computer program comprises a series of instructions which, when they are executed by a processor or a plurality of processors, implement the method according to one of the first to fourth embodiments. This computer program may be written in particular in assembler, in C language, or in any other suitable programming language.

According to a tenth embodiment, a non-transitory computer readable storage medium stores a computer program according to the ninth embodiment. This storage medium is for example a non-volatile memory of the EEPROM, ROM, Flash or battery-protected RAM type or a magnetic or optical medium. It may in particular be a proprietary or standard card (for example of the microSD type). According to one possible implementation, this program is stored in enciphered form that can be deciphered by the secure electronic circuit but not by the non-secured electronic devices (and in particular not by its main processor).

Examples of possible transformations are provided below.

One possible transformation consists of applying a contour detection (for identifying edges in image) followed by coloring of the edges lying in a certain range of angles with a color provided by the user at the time of enrollment. In order to reduce the risks of reproduction of this transformation by a third party physically spying on the user in the process of using his mobile equipment, the other edges may be colored with randomly chosen colors.

One possible transformation consists of applying a watermark at a position chosen by the user at the time of enrollment. The screen is partitioned into zones and a code or keyword is associated with each zone, indicating the spatial location (for example north, south, east, west and center) for identifying the zone. The user chooses the zone where the watermark is to be inserted by selecting the corresponding keyword. According to one embodiment, in order to reduce the risks of reproduction of this transformation by a third party physically spying on the user in the process of using his non-secured electronic device, random watermarks are placed on zones other than the one targeted.

One possible transformation consists of overlaying n (n is entered at the time of enrollment) times a chosen object on the image from a predefined list of objects. For example, geometric shapes (triangle, circle, square, trapezium). In order to reduce the risks of reproduction of this transformation by a third party physically spying on the user in the process of using his mobile equipment, other geometric shapes are overlaid in random numbers.

One possible transformation consists of a thresholding of the histogram of the colors. A previously defined color is then replaced by a color entered for example at the time of enrollment. In order to reduce the risks of reproduction of this transformation by a third party physically spying on the user in the process of using his mobile equipment, the other colors are also modified.

One possible transformation consists of a definition of a signature and encryption system. For example, conventional signature and encryption methods are established. A system relying on a public-key infrastructure is used. The service provides the user with his public-key and valid certificate. As for the user, he generates his key pair and has it certified by the service. Instead of the use of a PKI, techniques of signature by watermark and image encryption using bijective image transformations of the Boulanger, Peano, Hilbert or other type are possible. The latter technique requires only the exchange of a sequence of transformations and number of cycles to be effected.

In order to prevent a malevolent third party from using phishing techniques, and in the same way that a bank-card user must not disclose his PIN code, the user of the system must take care not to expose the image received. The obfuscation techniques used here prevent a third party from discovering the transformation method if he sees the transformed images a limited number of times. In order to make it even more difficult to discover the transformation, a parameter that makes it possible to vary the transformation (color, zone of the screen, number) is added to the challenge that the image constitutes.

To prevent the user from presenting the same numerical data item several times, the service may establish a system of the anti-latency type, in particular by means of the signature of the image transmitted by the user to the service.

Naturally the present invention is not limited to the embodiment described above by way of example; it extends to other variants.

Thus a method operating with a secure electronic device such as a server allowing bank transactions (to which a non-secured electronic device such a smartphone can be connected via for example a network such as the internet) was described above. However, the invention applies to any type of relevant server, and even to other electronic devices (such as devices capable of operating in P2P with the non-secured electronic device). Likewise, the non-secured electronic device has been presented as being able to be a personal computer or a smartphone, but it may obviously be an electronic device of a different type (for example a connected tablet, a connected MP3 reader, a connected PDA, a connected e-reader, etc.). Likewise, other types of user information other than those listed above may be used, in particular sound, with speech, or movements by virtue of an embodied gyroscope, or lines on the touch screen, or mimics made in front of the built-in camera can be used.

The invention claimed is:

1. A method for authenticating a secure electronic device from a non-secured electronic device comprising an input peripheral, an output peripheral and a secure electronic circuit, the method comprising:
    (a) taking control of the input peripheral and of the output peripheral by the secure electronic circuit;
    (b) opening a secure session by the secure electronic circuit with the secure electronic device;
    (c) acquiring, by the secure electronic circuit, user information, wherein the user information is a photograph taken by the input peripheral of the non-secured electronic device and controlled by the secure electronic circuit;
    (d) sending the photograph, by the secure electronic circuit to the secure electronic device;
    (e) receiving, by the secure electronic circuit, a transformed photograph from the secure electronic device;
    (f) sending the transformed photograph, by the secure electronic circuit to the output peripheral controlled by the secure electronic circuit;
    (g) obtaining authentication information by the secure electronic circuit from the input peripheral controlled by the secure electronic circuit, wherein the authentication information indicates whether or not the transformed photograph results from a predetermined transformation applied by the secure electronic device to the photograph;
    (h) authenticating the secure electronic device, by the secure electronic circuit, according to the authentication information obtained.

2. The authentication method according to claim 1, comprising releasing the input peripheral and the output peripheral by the secure electronic circuit, the release of the output peripheral being preceded by a sending, by the secure electronic circuit, of release information to said output peripheral.

3. A secure electronic circuit arranged so as to be installed in a non-secured electronic device comprising an input peripheral and an output peripheral, the secure electronic circuit comprising:
    an electronic control circuit for the input peripheral and output peripheral;
    an electronic secure session opening circuit arranged to open a secure session with a secure electronic device;
    an electronic user information acquiring circuit;
    an input peripheral arranged to take a photograph;
    an electronic transmission circuit arranged to send the photograph taken by the input peripheral to the secure electronic device;
    an electronic reception circuit arranged to receive a transformed photograph from the secure electronic device;
    an electronic transmission circuit arranged to send the transformed photograph to the output peripheral controlled by the secure electronic circuit;
    an electronic obtaining circuit arranged to obtain authentication information from the input peripheral controlled by the secure electronic circuit, wherein the authentication information indicates whether or not the transformed photograph results from a predetermined transformation applied by the secure electronic device to the photograph;

an electronic authentication circuit arranged to authenticate the secure electronic device according to the authentication information obtained.

4. The secure electronic circuit according to claim 3, comprising an electronic release circuit arranged to release the input peripheral and the output peripheral, and to send release information to said output peripheral before releasing it.

5. A non-transitory computer readable storage medium storing a computer program comprising a series of instructions which, when they are executed by a processor, implement steps comprising:

taking control of an input peripheral of a non-secured electronic device and of an output peripheral of the non-secured electronic device by a secure electronic circuit of the non-secured electronic device;

opening a secure session by the secure electronic circuit with a secure electronic device;

acquiring, by the secure electronic circuit, user information, wherein the user information is a photograph taken by the input peripheral of the non-secured electronic device and controlled by the secure electronic circuit;

sending the photograph, by the secure electronic circuit to the secure electronic device;

receiving, by the secure electronic circuit, a transformed photograph from the secure electronic device;

sending the transformed photograph, by the secure electronic circuit to the output peripheral controlled by the secure electronic circuit;

obtaining authentication information by the secure electronic circuit from the input peripheral controlled by the secure electronic circuit, wherein the authentication information indicates whether or not the transformed photograph results from a predetermined transformation applied by the secure electronic device to the photograph;

authenticating the secure electronic device, by the secure electronic circuit, according to the authentication information obtained.

* * * * *